Figure 1:
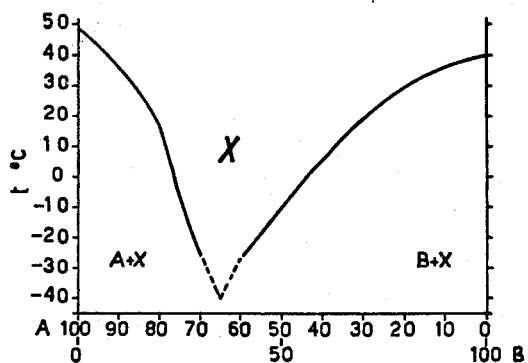

United States Patent Office 3,197,362
Patented July 27, 1965

3,197,362
PESTICIDAL LIQUID FORMULATIONS STABLE AT LOW TEMPERATURES
Franco Pinamonti and Sergio Maccone, Milan, Italy, assignors to Montecatini Societa Generale per l'Industria Mineraria e Chimica, Milan, Italy, a corporation of Italy
Filed June 26, 1962, Ser. No. 205,356
Claims priority, application Italy, June 30, 1961, 12,011/61
9 Claims. (Cl. 167—22)

Our invention relates to improvement of the formulation technique of pesticides, whereby stable liquid pesticide formulations are obtained. These formulations contain a satisfactory concentration of active substances with solvents which, while operating according to the known techniques, cannot be employed, since the solvents display an inadequate dissolving power of the active substances, at low temperatures.

Liquid formulations have the advantage of easy dosage and of ready dilution over solutions or emulsions suitable for agricultural use. Obviously, it is desirable that the concentration of active substances in these formulations be the highest possible in order to reduce the packing and transportation costs.

These formulations, however, should meet the following requirements, which are to be considered as essential:

(a) They must be physically stable at low temperatures, that is, no phase separation must occur;

(b) They must be chemically stable and thus must be able to maintain, for a certain period, the characteristics of the active substance and particularly the degree of activity against pests.

It is possible that a solvent, which at low temperature has a high dissolving power toward the active substance and is capable of being used to prepare high titer formulations, cannot be utilized due to the negative action which it has on the chemical stability of the active substance. On the other hand, a solvent acting favorably upon the chemical stability may be not employable because of its inadequate dissolving power. We have found that solvents better chemically suitable for formulation can be used, while having recourse to a particular mode of formulation.

Our invention has as an object liquid formulations with a high content of pesticidal substances, stable at low temperatures. Particularly suitable are formulations containing substances belonging to the class of the N-substituted amides of O,O - dialkyldithiophosphorylacetic acids. These formulations according to our invention, in addition to the pesticidal substance, contain at least one compound having a melting point near to the one of said pesticidal substance and form together with the latter, in a continuous system, a mixture remaining in the liquid state at temperatures lower than the melting temperature of the components of said mixture.

Our invention aims to provide liquid pesticidal formulations stable at low temperatures, which contain a high concentration of active substances in such solvents which are particularly suitable for formulation, owing to their stabilizing action and low cost, and which could not be employed while using known formulation methods, because of their inadequate dissolving power in regard to the active substances at low temperatures.

Our invention requires first a substance which is compatible with the active substance of the formulations, i.e. the substance shall not change the structure or influence negatively the mechanism of action of the active substance against pests, nor shall have any toxicity per se. By means of thermal analysis of the mixture at various ratios among active and additional substances, the ratios are established, with which the mixture remains in the liquid state at the temperatures which are of interest.

Subsequently, the solvents selected are those which show the best characteristics for the formulations with respect to chemical stability toward the active substances, even if they have an inadequate dissolving power. Thermal analysis of the admixture of active substance and additional substance (liquid at the considered temperatures) in the presence of variable amounts of solvent, also aids in solvent selection. The influence of further additional substances, for instance surfactants which are added in order to complete the formulation, is analogously determined.

We have ascertained that the behavior of the mixture in respect to the solvent is remarkably different from that of the pesticidal substance itself in respect to the solvent, and that concentration limits are attainable, which otherwise could not be attained by use of the same solvents. We have found that substances belonging to the classes of simple or substituted phenols and cresols may be added to the substances belonging to the class of alkylamides of O,O-dialkyldithiophosphorylacetic acids, to form binary mixtures utilizable in accordance with our invention.

FIG. 1 illustrates the behavior of a mixture comprising methylamide of O,O-dimethyldithiophosphorylacetic acid and phenol.

Figure 2:
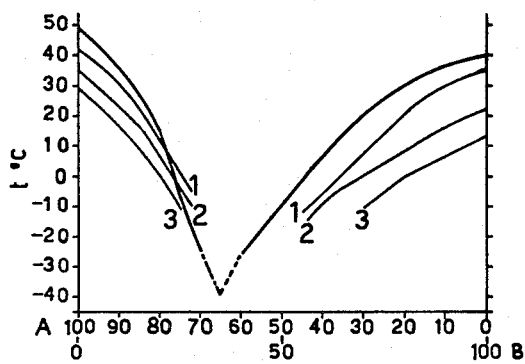

FIG. 2 illustrates the behavior of the monomethylamide of O,O-dimethyldithiophosphorylacetic acid and phenol system at constant xylene percentages. Curve 1 constant=10% xylene; curve 2 constant=30% xylene; curve 3 constant=50% xylene. The behavior of ternary system of monomethylamide of O,O - dimethyldithiophosphorylacetic acid, phenol and xylene (see FIG. 2) represents examples of constant xylene percentages and can be represented by a ternary graph from which it is possible to find out the composition of any mixture comprising monomethylamide of O,O-dimethyldithiophosphorylacetic acid, xylene and phenol.

Figure 3:
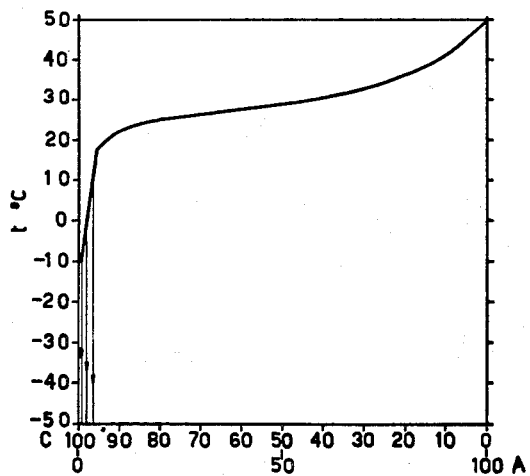

FIG. 3 illustrates the behavior of monomethylamide of O,O-dimethyldithiophosphorylacetic acid and xylene.

In the figures, monomethylamide of O,O-dimethyldithiophosphorylacetic acid is indicated with A, phenol with B and xylene with C.

In FIG. 1, it is noted that at −10° C. the admixtures A+B containing from 50 to 75% A occur in the liquid state.

In FIG. 2, it is noted (curve 3) that admixtures A+B containing 50% C occur in the liquid state at −10° C. with concentrations of A ranging from 37 (74 multiplied by 0.5, since it is operated in the presence of 50% C) to 15% (30×0.5). At the same temperature, admixtures A+B containing 30% C (curve 2) occur in the liquid state with concentrations of A ranging from 50 (71×0.7) to 28% (40×0.7). Curve 1 relates to the system A+B with 10% C. No appreciable change occurs in the curves of FIG. 2, when small amounts of surfactants are replaced for the xylene.

Dissimilarity of behavior between the system A+B/xylene and the system A/xylene is clearly seen by comparing diagram 2 with FIG. 3. At −10° C. in the system A/xylene, the separation of solid substance occurs at a concentration of 1% A.

In order to make even more evident the technical significance of this invention, some data are reported showing the values of percentage degradation of the monomethylamide of O,O-dimethyldithiophosphorylacetic acid titer (referred to the starting titer of the active substance at 70° C.) and of 20% solutions of active substance in a series of solvents. The determination of the content of the active substance was carried out by the arsenometric method published in "La Chimica e l'Industria" (April 1960, Fusco, Placucci, Marchese and Losco), in which the degradation products are not determined.

| 20% solutions of N-monomethylamide of O,O-dimethyldithiophosphorylacetic acid in the indicated solvents | Percent Degradation of the arsenometric titer after storage at 70° C. for 10 days |
|---|---|
| Diethylene glycol | 98.0 |
| Propylene glycol | 91.5 |
| Benzylic alcohol | 86.0 |
| Triethylene glycol | 84.0 |
| Methylcyclohexane | 72.0 |
| Methyl alcohol | 70.0 |
| Amyl alcohol | 66.0 |
| Isoamyl alcohol | 62.0 |
| Isobutyl alcohol | 56.0 |
| Butyl alcohol | 55.5 |
| Methylcellosolve | 52.0 |
| Methylisobutylcarbinol | 32.0 |
| Diacetonalcohol | 28.0 |
| Tri-isobutylphosphate | 23.5 |
| Tri-n-propylphosphate | 19.5 |
| Acetophenone | 18.0 |
| Methylcyclohexanone | 17.0 |
| Methylamylketone | 10.0 |
| Ethylamylketone | 9.0 |
| Butylcarbitolacetate | 8.0 |
| Methylamylacetate | 8.0 |
| Butyl-Cellosolve acetate | 6.0 |
| Triethylphosphate | 5.0 |
| Methylisobutylketone | 4.0 |
| Primary amylacetate | 2.0 |
| Cyclohexanone | 2.0 |
| Carbitol acetate | 2.0 |
| Cellosolve acetate | 0.5 |
| Xylene | 0.5 |
| N-monomethylamide of O,O-dimethyldithiophosphorylacetic acid, active substance 95% | 100.0 |

The above data show that some solvents slow down to a more or less remarkable extent, the degradation of the considered compound; said solvents belong to the class of aromatic hydrocarbons, of aliphatic and cyclic ketones, of primary alcohols acetates, and of glycoethers and trialkylphosphoric esters.

Copending application Serial No. 105,283, filed April 25, 1961, now Patent No. 3,090,719, having a common assignee, teaches that an improvement of the methylamide of O,O-dimethyldithiophosphorylacetic acid formulation technique consists in employing solvents, belonging to the above-indicated classes, having a stabilizing action.

Among the above-mentioned solvents, Cellosolve acetate, which displays a strong stabilizing action on the methylamide of O,O-dimethyldithiophosphorylacetic acid, could not be used in high concentrated formulations since the solubility of the active substance in Cellosolve acetate is, at 0° C. about 27%, and at −10° C. about 17%.

In contrast thereto, according to the present invention, formulations with the same solvent containing up to 50% of active substance may be prepared, said formulations being stable between 0° and −10° C.

The same phenomena occur for carbitol acetate, wherein the methylamide of O,O-dimethyldithiophosphorylacetic acid is soluble in percentages of 30% at 0° C., and of 25% at −10° C. According to the process which is the object of this invention, formulations may be prepared, with the same solvent, which contain up to 50% of active substance.

Xylene has proved to be particularly suitable due to its high stabilizing action, its low cost or for its flash point which is higher than the limit fixed by the World Health Organization. Xylene, however, cannot be employed as sole solvent in said formulations since the active substances show, at low temperatures, an insufficient solubility therein (see FIG. 3). In cases like this the present invention makes possible proper formulation. This is also true for formulation compositions with not particularly high content of active substances, e.g. 20% of active substance (a.s.).

Therefore, a further object of this invention is the obtainment of formulations with not particularly high concentration of active substances, by means of solvents having characteristics particularly suitable for the formulation, which however cannot be employed owing to their inadequate dissolving power.

Hereinafter are reported data employing as active substance, the N-monomethylamide of O,O-dimethyldithiophosphorylacetic acid formulations on the basis of methanol and of xylene-phenol, both formulations according to this invention, being stable at low temperatures, in order to show the different degradation degree in the time, owing to the use of two different solvents. Tests were carried out by keeping the formulations in closed vessel for 30 days at 50° C.

Degradation value was determined by arsenometric titration.

FORMULATION A

|  | Percent |
|---|---|
| Active substance | 20 |
| Methanol | 78 |
| Surfactant | 2 |

Degradation: 39%.

FORMULATION B

|  | Percent |
|---|---|
| Active substance | 20 |
| Phenol | 10 |
| Xylene | 66 |
| Surfactant | 4 |

Degradation: 1%.

FORMULATION C

|  | Percent |
|---|---|
| Active substance | 50 |
| Methanol | 47 |
| Surfactant | 3 |

Degradation: 80%.

FORMULATION D

|  | Percent |
|---|---|
| Active substance | 50 |
| Phenol | 20 |
| Xylene | 27 |
| Surfactant | 3 |

Degradation: 8%.

The surfactant can be non-ionic of the type consisting of condensates of ethylene oxide with alkyl-phenols or fatty acids, or anionic of the type of alkaline alkylarylsulphonates. Other surfactants are also suitable.

The invention is hereinafter further illustrated but not restricted by the following examples, which relate to formulations stable between 0 and −10° C.

*Example 1*

A formulation was prepared at room temperature by mixing under mild stirring, without keeping a preferential order, the following components: 50 g. monomethylamide of O,O-dimethyldithiophosphorylacetic acid having a 95% purity, 20 g. synthetic phenol, 27 g. xylene and 3 g. of an anionic emulsifier selected from the class consisting of alkaline alkylarylsulphonates and the condensation products of ethylene oxide with fatty acids or alkylphenols. Degradation tests: after 30 days at 50° C.=8%; after 60 days at 40° C.=2.5%; after 180 days at 35° C.=5.5%; after 1 year at room temperature=3.5%.

*Example 2*

50 g. monomethylamide of O,O-dimethyldithiophosphorylacetic acid having a 95% purity were mixed with 20 g. synthetic phenol until a spontaneous formation of liquid phase took place. 27 g. of xylene were added and 3 g. of an anionic emulsifier selected from the class consisting of alkaline alkylarylsulphonates and the condensation products of ethylene oxide with fatty acids or alkylphenols. The degradations are analogous to those obtained in Example 1.

Example 3

The following formulation was prepared according to the method indicated in Examples 1 and 2:

| | Percent |
|---|---|
| Monomethylamide of O,O-dimethyldithiophosphorylacetic acid (having 95% purity) | 40 |
| Phenol | 18 |
| Xylene | 38 |
| Anionic surfactant selected among alkali metal alkylarylsulphonates | 4 |

Degradation tests: after 30 days at 50° C.=2%; after 60 days at 40° C.=2.5%.

Example 4

The following formulation was prepared according to the method indicated in Example 2:

| | Percent |
|---|---|
| Monomethylamide of O,O-dimethyldithiophosphorylacetic acid (95% purity) | 30 |
| Phenol | 12 |
| Xylene | 55 |
| Anionic surfactant selected among the alkali metal alkylarylsulphonates | 3 |

Degradation tests: after 30 days at 50° C.=1.5%; after 60 days at 40° C.=0%; after 180 days at 35° C.=0%; at room temperature after 1 year=0%.

Example 5

The following formulation was prepared according to the method described in Example 2:

| | Percent |
|---|---|
| Monomethylamide of O,O-dimethyldithiophosphorylacetic acid (95% purity) | 20 |
| Phenol | 10 |
| Xylene | 66 |
| Anionic surfactant selected among the alkali metal alkylarylsulphonates | 4 |

Degradation tests: at 50° C. after 30 days=0.5–1%; at 40° C. after 60 days=0%; at 35° C. after 180 days=0%; at room temperature after 1 year=0%.

Example 6

The following formulation was prepared according to the method described in Example 2:

| | Percent |
|---|---|
| Monomethylamide of O,O-dimethyldithiophosphorylacetic acid (95% purity) | 50 |
| Phenol | 28 |
| Cellosolve acetate 99% | 19 |
| Anionic surfactant selected among the alkali metal alkylarylsulphonates | 3 |

Degradation test: after 30 days at 50° C.=10%.

Example 7

The following formulation was prepared according to the method described in Example 2:

| | Percent |
|---|---|
| Monomethylamide of O,O-dimethyldithiophosphorylacetic acid (95% purity) | 40 |
| Phenol | 18 |
| 99% Cellosolve acetate | 39 |
| Anionic surfactant selected among the alkali metal alkylarylsulphonates | 3 |

Degradation test: after 30 days at 50° C.=6%.

Example 8

The following formulation was prepared according to the method described in Example 2:

| | Percent |
|---|---|
| Monomethylamide of O,O-dimethyldithiophosphorylacetic acid (95% purity) | 30 |
| Phenol | 12 |
| Cellosolve acetate (99% purity) | 55 |
| Anionic surfactant selected among the alkali metal alkylarylsulphonates | 3 |

Degradation test: after 30 days at 50° C.=3%.

Example 9

The following formulation was prepared according to the method described in Example 2:

| | Percent |
|---|---|
| Monomethylamide of O,O-dimethyldithiophosphorylacetic acid (95% purity) | 50 |
| Phenol | 30 |
| Carbitol acetate | 17 |
| Anionic surfactant selected among the alkali metal alkylarylsulphonates | 3 |

Example 10

The following formulation was prepared according to the method described in Example 2:

| | Percent |
|---|---|
| Monomethylamide of O,O-dimethyldithiophosphorylacetic acid (95% purity) | 50 |
| Cresol (o, m, or p) | 25 |
| Xylene | 20 |
| Anionic surfactant selected among the alkali metal alkylarylsulphonates | 5 |

Degradation test: after 30 days at 50° C.=9%.

Example 11

The following formulation was prepared according to the method described in Example 2:

| | Percent |
|---|---|
| Monomethylamide of O,O-dimethyldithiophosphorylacetic acid (95% purity) | 20 |
| Cresol (o, m, or p) | 10 |
| Xylene | 65 |
| Anionic surfactant selected among the alkali metal alkylarylsulphonates | 5 |

Degradation test: after 30 days at 50° C.=1–2%.

We claim:

1. A liquid pesticidal formulation, stable at low temperatures, containing in a solvent selected from the group consisting of xylene and Cellosolve acetate, as a first component the monomethylamide of O,O-dialkyldithiophosphorylacetic acid and a second component selected from the group consisting of phenol and o, m, and p cresol and which forms with monomethylamide of O,O-dialkyldithiophosphorylacetic acid, in a eutectic system, a liquid mixture at temperatures lower than the melting temperature of the two components which form the eutectic.

2. A liquid pesticidal formulation, stable at low temperatures, which contains by weight:
   (a) 50 parts of monomethylamide of O,O-dimethyldithiophosphorylacetic acid
   (b) 20 parts of phenol
   (c) 27 parts of xylene
   (d) 3 parts of an anionic emulsifier.

3. A liquid pesticidal formulation, stable at low temperatures, which contains by weight:
   (a) 40 parts of monomethylamide of O,O-dimethyldithiophosphorylacetic acid
   (b) 18 parts of phenol
   (c) 38 parts of xylene
   (d) 4 parts, as an anionic surfactant, of alkali metal alkylarylsulfonate.

4. A liquid pesticidal formulation, stable at low temperatures, which contains by weight:
   (a) 30 parts of monomethylamide of O,O-dimethyldithiophosphorylacetic acid
   (b) 12 parts of phenol
   (c) 55 parts of xylene
   (d) 3 parts, as an anionic surfactant, of alkali metal alkylarylsulfonate.

5. A liquid pesticidal formulation, stable at low temperatures, which contains by weight:
(a) 20 parts of monomethylamide of O,O-dimethyldithiophosphorylacetic acid
(b) 10 parts of phenol
(c) 66 parts of xylene
(d) 4 parts, as an anionic surfactant, of alkali metal alkylarylsulfonate.

6. A liquid pesticidal formulation, stable at low temperatures, which contains by weight:
(a) 50 parts of monomethylamide of O,O-dimethyldithiophosphorylacetic acid
(b) 28 parts of phenol
(c) 19 parts of Cellosolve acetate
(d) 3 parts, as an anionic surfactant, of alkali metal alkylarylsulfonate.

7. A liquid pesticidal formulation, stable at low temperatures, which contains by weight:
(a) 30 parts of monomethylamide of O,O-dimethyldithiophosphorylacetic acid
(b) 13 parts of phenol
(c) 55 parts of Cellosolve acetate
(d) 3 parts, as an anionic surfactant, of alkali metal alkylarylsulfonate.

8. A liquid pesticidal formulation, stable at low temperatures, which contains by weight:
(a) 50 parts of monomethylamide of O,O-dimethyldithiophosphorylacetic acid
(b) 30 parts of phenol
(c) 17 parts of carbitol acetate
(d) 3 parts, as an anionic surfactant, of alkali metal alkylarylsulfonate.

9. A liquid pesticidal formulation, stable at low temperatures, which contains by weight:
(a) 50 parts of monomethylamide of O,O-dimethyldithiophosphorylacetic acid
(b) 25 parts of cresol
(c) 20 parts of xylene
(d) 5 parts, as an anionic surfactant, of alkali metal alkylarylsulfonate.

References Cited by the Examiner

UNITED STATES PATENTS

| | | | |
|---|---|---|---|
| 2,112,381 | 3/38 | Salzberg | 167—425 |
| 3,004,055 | 10/61 | Perini et al. | 167—22 |
| 3,067,096 | 12/62 | Trace et al. | 167—22 |
| 3,077,431 | 2/63 | Baker et al. | 167—22 |
| 3,090,719 | 5/63 | Pinamonti | 167—22 |
| 3,093,536 | 6/63 | Loeffler | 167—22 |
| 3,097,128 | 7/63 | Sprinkle et al. | 167—22 |

OTHER REFERENCES

Soap & Sanitary Chem., November 1948, p. 149.

JULIAN S. LEVITT, *Primary Examiner.*

LEWIS GOTTS, *Examiner.*